United States Patent
Morrow et al.

(10) Patent No.: US 6,513,402 B1
(45) Date of Patent: *Feb. 4, 2003

(54) MULTI-SPEED AUTOMOTIVE TRANSMISSION USING PAIRED HELICAL GEARING

(75) Inventors: William Bruce Morrow, Santa Barbara, CA (US); Eric William Laveen, Eagan, MN (US)

(73) Assignee: Harrier Technologies, Inc., Greenwich, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/723,088

(22) Filed: Nov. 27, 2000

Related U.S. Application Data (63) Continuation of application No. 09/187,905, filed on Nov. 6, 1998, now Pat. No. 6,189,397.

(51) Int. Cl.[7] ............... F16H 3/06; F16H 3/22
(52) U.S. Cl. ............... 74/410; 74/331; 74/342
(58) Field of Search ............ 74/410, 325, 331, 74/342, 344

(56) References Cited

U.S. PATENT DOCUMENTS

| | | | |
|---|---|---|---|
| 1,070,589 A | 8/1913 | Duffing | |
| 1,273,556 A | 7/1918 | Warriner | |
| 1,320,459 A | 11/1919 | Edwards | |
| 3,545,296 A | 12/1970 | Eggins | |
| 4,612,816 A | 9/1986 | Chalik | |
| 4,709,590 A | 12/1987 | Richards | 74/410 |

FOREIGN PATENT DOCUMENTS

| | | | |
|---|---|---|---|
| EP | 0 244 263 | 11/1987 | 74/331 |
| GB | 1 157 302 | 5/1985 | 74/410 |

*Primary Examiner*—William C Joyce
(74) *Attorney, Agent, or Firm*—Kenyon & Kenyon (57) ABSTRACT

A multi-speed transmission suitable for automotive-type use employs paired helical gears. For each speed of the transmission, at least one pair of helical cut gears is mounted on an input drive shaft for engaging and mating at least one pair of helical cut gears mounted on an idler shaft. During load transmission for a given speed, the helical gear pairs on the idler shaft center themselves on the helical gear pairs on the drive shaft to balance load transmission amongst gears. The idler shaft would also have at least one pair of helical cut gears to engage and mate at least one pair of helical cut gears on a power output shaft.

14 Claims, 3 Drawing Sheets

MULTI-SPEED AUTOMOTIVE TRANSMISSION USING PAIRED HELICAL GEARING

This application is a continuation application under 37 C.F.R. §1.53(b) of prior application Ser. No. 09/187,905 filed Nov. 6, 1998, now U.S. Pat. No. 6,189,397. The disclosures of the specification, claims, drawings and abstract of application Ser. No. 09/187,905 are incorporated herein by reference.

FIELD OF THE INVENTION

The present invention is directed to improvements in multi-speed transmissions suitable for automotive uses. More particularly, the present invention is directed to a multi-speed transmission using paired helical gears wherein a compact transmission can be provided having increased power capacity compared to a conventional transmission.

BACKGROUND OF THE INVENTION

Gear transmissions having pairs of helical gears mounted on a drive shaft for engagement with respective pairs of helical gears mounted on a driven shaft resulting in even load sharing amongst gears are disclosed in copending U.S. patent application Ser. No. 09/167,760 filed Oct. 7, 1998 which is a continuation application under 35 U.S.C. §120 of pending application Ser. No. 09/021,622 filed Feb. 9, 1998, both of the preceding applications being entitled IMPROVEMENTS IN POWER SHARING GEAR SETS. The disclosures, including the disclosures of the specification and drawings of prior U.S. patent application Ser. No. 09/167,760 filed Oct. 7, 1998 and Ser. No. 09/021,622 filed Feb. 9, 1998 are hereby expressly incorporated by reference into this present application.

Paired helical gearing permits, as a practical matter, power sharing among multiple gears on a single shaft. Prior to the invention of paired helical gearing, very precise tolerances were required to successfully construct a transmission which had multiple gears on a common shaft. Therefore, prior to the invention of paired helical gearing, transmissions with multiple gears on a single shaft were for most purposes commercially impractical.

A major commercial application for paired helical gearing is transmissions that have constraints on the size of the diameter of gears due to space limitations, but which are also required to transmit significant power.

The present invention is directed to the use of paired helical gearing to provide for multi-speed transmissions suitable for automotive use. In the present application, transmissions for automotive use includes within its meaning, but is not limited to, uses in automobiles, trucks, farm equipment, earth moving equipment, ships, boats and the like.

OBJECTS OF THE INVENTION

It is an object of the present invention to provide a multi-speed automotive transmission that employs paired helical gearing.

It is also an object of the present invention to provide a multi-speed automotive transmission that is compact in size but has a high power capacity.

These and other objects of the present invention will become apparent from the following description and claims read in conjunction with the drawings.

SUMMARY OF THE INVENTION

The present invention is directed to a multi-speed transmission suitable for automotive-type uses. The transmission comprises an input drive shaft and idler shafts. Each speed of the transmission is provided by at least one pair of helical cut drive gears mounted on the drive shaft being engaged and mated by at least one pair of helical cut driven gears mounted on an idler shaft. The hand or the sense of the drive and driven helical cut gear pairs is selected so that upon engagement and mating of a selected pair of drive and driven helical cut gears for a given transmission speed, thrust forces are created to cause the pair of driven helical cut gears mounted on the idler shaft to move toward one another. The selected pair of driven helical gears mounted on the idler shaft also move together on the idler shaft to center themselves on the respective drive helical gears on the input drive shaft to balance the load and to provide for an approximate equal sharing of the transmitted load amongst gears.

For uses requiring large transmissions of power, for each speed of the transmission, two or more pairs of helical cut gears may be provided on the drive shaft for being engaged respectively by two or more pairs of helical cut gears provided on the idler shaft.

An output shaft is provided having mounted thereon one or more pairs of helical cut driven gears for rotating the output shaft. The idler shaft has mounted thereon one or more pairs of drive output helical cut gears rotated by the idler shaft and for engaging and mating the one or more helical gear pairs mounted on the output shaft for transmission of power to the output shaft.

BRIEF DESCRIPTION OF THE DRAWINGS

In the drawings forming part hereof.

DETAILED DESCRIPTION

In order to provide a more complete understanding of the present invention and an appreciation of its advantages, a detailed description of preferred embodiments is now provided with reference to the drawings.

Figure 1:
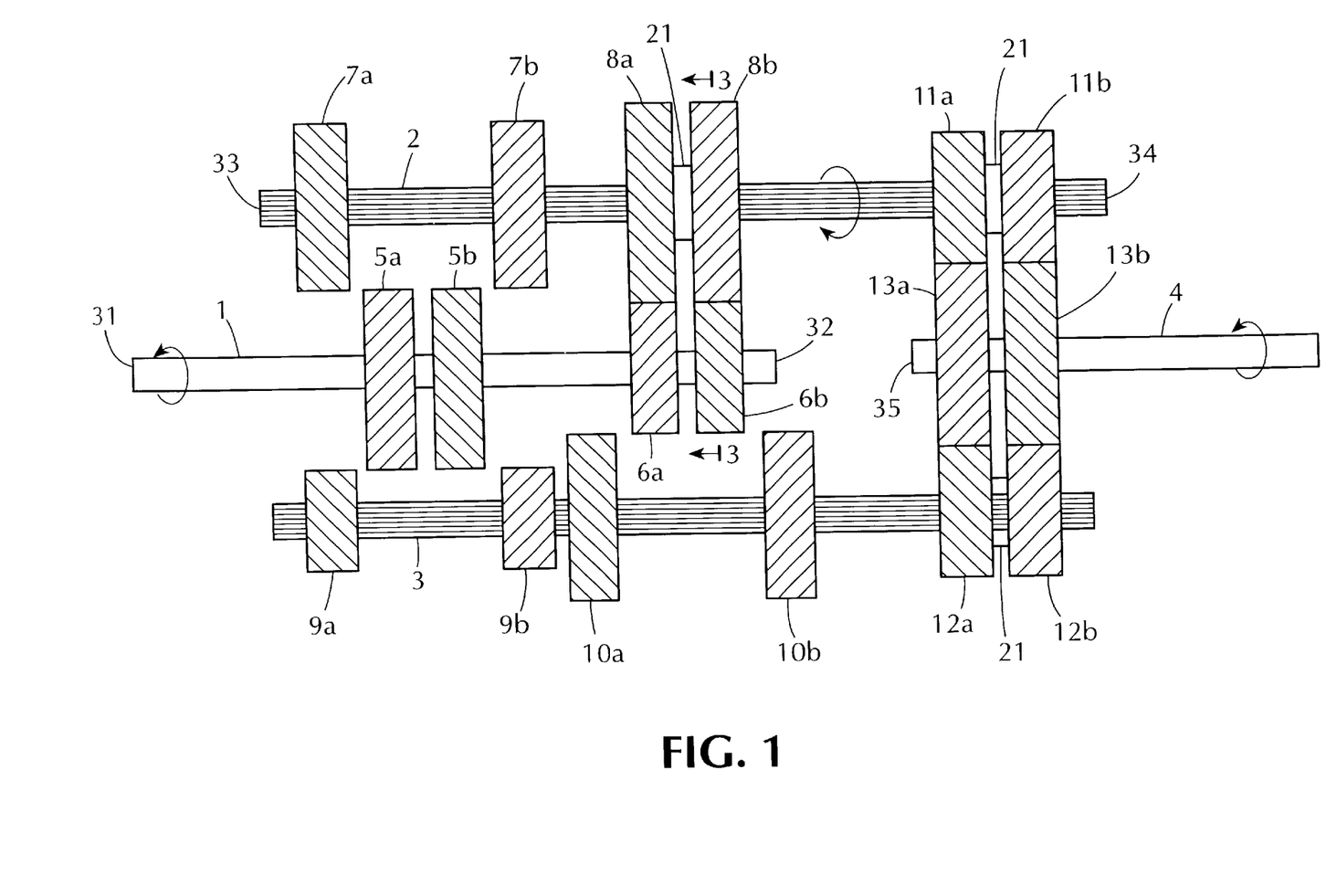
FIG. 1 is a schematic view of one embodiment of an automotive transmission in accordance with the present invention illustrating a four speed transmission using for each speed of the transmission one pair of paired helical gears on an input drive shaft and one pair of paired helical gears on an idler shaft.

FIG. 1 schematically illustrates one embodiment of an automotive or multi-speed transmission, in accordance with the present invention, which provides for four speeds.

In the embodiment of FIG. 1, one pair of drive helical gears on a drive input shaft engages one pair of driven helical gears on an idler shaft to provide for each transmission speed.

The multi-speed automotive type transmission of FIG. 1 comprises a input drive shaft 1, two idler shafts 2 and 3, and an output shaft 4. The embodiment illustrated in FIG. 1 provides for four speeds. However, the present invention is not limited to the use of only two idler shafts. If desired, as many idler shafts may be employed as can be fit around the input shaft, thus allowing for a multitude of speeds. Similarly, in the embodiment illustrated in FIG. 1, only two pairs of helical drive gears are illustrated mounted on the input drive shaft 1. The number of speeds available may be increased by increasing the number of drive helical gear pairs mounted on the input drive shaft and correspondingly increasing the number of driven helical gear pairs mounted on the idler shafts.

With reference to FIG. 1, input drive shaft 1 has a first end 31 and a second end 32. First end 31 of input drive shaft 1 is connected to a prime mover, such as an automobile internal combustion engine (not illustrated), for rotation by the prime mover. In the embodiment illustrated, the prime mover rotates the input drive shaft 1 in the clockwise direction as illustrated by the arrow. As will be appreciated, a prime mover, such as an automobile internal combustion engine, will always rotate the input drive shaft in the same direction.

Mounted for rotation on input drive shaft 1 are a first pair of drive helical gears 5a, 5b and a second pair of drive helical gears 6a, 6b. In the embodiment of FIG. 1, drive helical gear pairs 5a, 5b and 6a, 6b are mounted on input drive shaft 1 for rotation by input drive shaft 1 and they are also fixedly mounted to input drive shaft 1 so that they cannot move in the axial direction of input drive shaft 1. As will hereinafter become apparent, it is only functionally necessary that drive helical gears of each pair be restrained from separating from one another in the axial direction of input drive shaft 1. In the embodiment illustrated in FIG. 1, the outside diameter of drive helical gear pair 5a, 5b is greater than the outside diameter drive helical gear pair 6a, 6b.

Located parallel to input drive shaft 1 are first idler shaft 2 and second idler shaft 3. Driven helical gear pair 7a, 7b is mounted on first idler shaft 2 to rotate first idler shaft 2 when driven helical gear pair 7a, 7b engages and mates with drive helical gear pair 5a, 5b.

Driven helical gear pair 8a, 8b is mounted on first idler shaft 2 to rotate first idler shaft 2 when driven helical gear pair 8a, 8b engages and mates with drive helical gear pair 6a, 6b.

Driven helical gear pair 9a, 9b is mounted on second idler shaft 3 to rotate second idler shaft 3 when driven helical gear pair 9a, 9b engages and mates with drive helical gear pair 5a, 5b. Driven helical gear pair 10a, 10b is mounted on second idler shaft 3 to rotate second idler shaft 3 when driven helical gear pair 10a, 10b engages and mates with drive helical gear pair 6a, 6b.

Driven helical gear pairs 7a, 7b; 8a, 8b; 9a, 9b; and 10a, 10b are also mounted on their respective idler shafts 2 and 3 for axial movement on the respective idler shaft. In the embodiment illustrated in FIG. 1, this axial movement is provided for by idler shafts 2 and 3 being spline shafts with the respective driven helical gear pairs being splined to their respective idler shaft. The spline idler shafts firmly rotationally link the driven helical gears to the spline shaft but also allow axial movement of the driven helical gears on the spline shaft.

Figure 3:
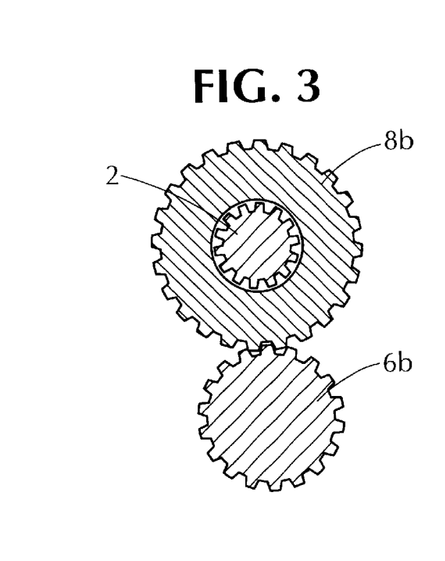
FIG. 3 is a schematic cross-sectional view along line 3—3 of FIG. 1.
Figure 4:
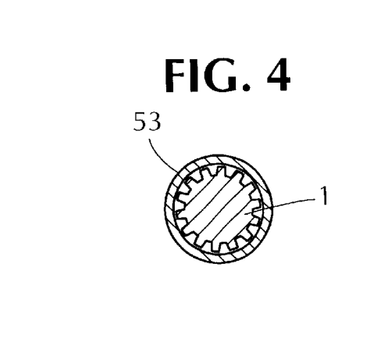
FIG. 4 is a schematic cross-sectional view along line 4—4 of FIG. 2.

FIG. 3 is a schematic cross-section along line 3—3 of FIG. 1 and illustrates driven helical gear 8b splined to idler shaft 2 and drive helical gear 6b fixedly mounted to input drive shaft 1 whereby the drive helical gear 6b does not move in the axial direction of the input drive shaft 1. In the non-limiting example illustrated in FIG. 3, drive helical gear 6b and input drive shaft 1 are machined from the same stock of material. In the embodiment illustrated in FIG. 1, the idler shafts are spline shafts and the driven helical gear pairs are splined to the idler shafts for axial movement on their respective idler shaft. However, the present invention is not limited to use of a spline shaft arrangement for the idler shafts. Any mechanical design, e.g., a keyed design, which permits appropriate axial movement of a respective driven helical gear pair on a respective idler shaft would be within the scope of the present invention. Likewise, any mechanical design which prevents drive helical gear pairs mounted on the input drive shaft from separating from one another in the axial direction of the input drive shaft during force transmission would be within the scope of the present invention.

It will be apparent to one skilled in the art that the embodiment illustrated in FIG. 1 provides for four speeds, i.e., gears 7a, 7b engaging and mating gears 5a, 5b; gears 9a, 9b engaging and mating gears 5a, 5b; gears 8a, 8b engaging and mating gears 6a, 6b; and gears 10a, 10b engaging and mating gears 6a, 6b. It will also be apparent to one skilled in the art, by way of example, in the illustrated embodiment of FIG. 1, the diameter of driven helical gears 8a, 8b is larger than the diameter of drive helical gears 6a, 6b thereby providing for a rotational speed reduction or step down. On the other hand, the diameter of driven helical gears 9a, 9b is smaller than the diameter of drive helical gears 5a, 5b, thereby providing for a rotational speed increase, a step up or overdrive. It will be apparent that the gear ratios for each speed may be varied, as desired, by one skilled in the art as required by the intended use of the transmission.

Drive helical gear 5a and drive helical gear 5b each have a helical cut at the same angle but in the opposite sense (or opposite hand) to one another. Driven helical gear 7a and driven helical gear 9a each have a helical cut at the same angle but in the opposite sense (or opposite hand) to the helical cut of drive helical gear 5a. Driven helical gear 7b and driven helical gear 9b each have a helical cut at the same angle but in the opposite sense (or opposite hand) to the helical cut of drive helical gear 5b. The sense of the angle of the helical cuts is such that a thrust force is developed wherein driven helical gears 7a, 7b or 8a, 8b will move toward each other in the axial direction of the respective idler shaft when input shaft 1 is rotated by the prime mover and they are respectively engaged and mated by drive helical gear pair 5a, 5b. Likewise, the sense of the angle of the helical cuts develops a thrust force such that when the input shaft 1 is rotated by the prime mover, if drive helical gear pair 5a, 5b is engaged and mated with either driven helical gear pair 7a, 7b or 9a, 9b, drive helical gear pair 5a, 5b will be subjected to forces wanting to spread helical gears 5a, 5b apart from one another in the axial direction of input drive shaft 1. However, as previously discussed, helical gears 5a and 5b do not actually move in the axial direction of input drive shaft 1 because they are fixedly mounted to input drive shaft 1 to prevent such axial movement.

The sense of the angle of the helical cut for drive helical gear pair 6a, 6b and driven helical gear pairs 8a, 8b and 10a, 10b are the same as described with respect to drive helical gear pair 5a, 5b and driven helical gear pairs 7a, 7b and 9a, 9b. That is when either driven helical gear pair 8a, 8b or 10a, 10b engages and mates with drive helical gear pair 6a, 6b thrust force developed by the rotation of input drive shaft 1 by the prime mover will cause either driven helical gear pair 8a, 8b or driven helical gear pair 10a, 10b, to move toward each other, as the case may be, in the axial direction of the respective idler shaft. Likewise, forces will be created wanting to spread drive helical gears 6a, 6b apart from one another in the axial direction of the input drive shaft 1, but again, drive helical gears 6a, 6b do not move in the axial direction because they are fixedly mounted to the input drive shaft 1 to prevent such movement.

In the embodiment illustrated in FIG. 1, driven helical gear pair 8a, 8b is engaged and mated with drive helical gear pair 6a 6b. Input drive shaft 1 rotates drive helical gear pair 6a, 6b which rotate driven helical gear pair 8a, 8b which in turn causes idler shaft 2 to rotate. In the illustrated embodiment, input drive shaft 1 rotates in the clockwise direction and idler shaft 2 rotates in the counter clockwise direction. All other driven helical gear pairs on idler shafts 2 and 3 are disengaged from their respective drive helical gear pair on the input drive shaft 1.

As previously discussed the sense of the angle of the helical cut on driven gears 8a, 8b creates thrust forces due to rotation which cause gears 8a and 8b to move toward each other in the axial direction of the idler shaft 2. A spacer member 21 between gears 8a and 8b prevents the side of gear 8a facing the second end 34 of idler shaft 2 from abutting the side of gear 8b facing the first end 33 of idler shaft 2. Spacer member 21, as illustrated, is a cylindrical collar mounted on idler shaft 2 in such a way as to permit cylindrical collar 21 to move in the axial direction of the idler shaft 2. There is no need to spline cylindrical collar 21 to idler shaft 2. It need only be mounted on the idler shaft 2 loose enough to slide along the shaft. The forces created by rotation also cause driven helical gears 8a, 8b which are being pressed against one another but remain separated by the collar spacer 21 to move together in the axial direction of the idler shaft 2 to center driven helical gears 8a, 8b with respective drive helical gears 6a, 6b so that load transmitted from 6a to 8a and 6b to 8b is balanced. That is, there is an approximate equal load sharing.

The spacer 21 creates a gap between the inner faces of gears driven 8a and 8b when the gears are loaded and forced together as described above. This gap prevents contact between driven gear 8a and driving gear 6b, or driven gear 8b and driving gear 6a from occurring. That is, if due to manufacturing inaccuracies, driven helical gear pair 8a and 8b move a substantial distance axially relative to drive pair 6a and 6b while centering opposite the drive pair, driven gear 8a could contact drive gear 6b, or alternatively, driven gear 8b could contact drive gear 6a, were there insufficient space between the gears to prevent such contact. Such contact would result in failure of the contacting gears.

The foregoing discussion with respect to driven helical gear pair 8a, 8b engaging and mating drive helical gear pair 6a, 6b would apply to driven helical gear pair 7a, 7b engaging and mating drive helical gear pair 5a, 5b; driven helical gear pair 9a, 9b engaging and mating drive helical gear pair 5a, 5b; and driven helical gear pair 10a, 10b engaging and mating drive helical gear pair 6a, 6b.

A detailed discussion of the operation of paired helical gears subjected to rotation and load may be found in the previously referenced Ser. No. 09/167,760 and Ser. No. 09/021,662.

The previously discussed spacer or collar member 21 is only by way of illustration. The collar member 21 could be replaced with projections on the sides of gears 8a, 8b facing one another. The transmission would also operate if gears 8a and 8b were permitted to abut one another, as long as there was a sufficient gap between driving gears 6a and 6b to prevent the above-mentioned contact between gears 6a and 8b or 6b and 8a. The preferred spacing between the sides of gears 8a and 8b depends upon the expected relative axial movement between the drive and driven gear pairs. In practice, a gap of about 1 or 2 mm would suffice. This would also apply to gear pairs 7a, 7b; 9a, 9b; and 10a, 10b. There would also be, preferably, a spacer, such as collar 21, located between gear pairs 7a, 7b; 9a, 9b; and 10a, 10b (not illustrated). The same considerations would apply to the spacing between fixed drive helical gears 6a, 6b and 5a, 5b.

In another embodiment of the present invention, a multi-speed transmission could be provided using a drive input shaft and just one idler shaft. For example, with reference to FIG. 1, if idler shaft 2 was the only idler shaft present, a two speed transmission would be provided, in accordance with the present invention, wherein each speed of the transmission comprises one pair of paired helical cut gears on the input drive shaft and one pair of paired helical cut gears on the idler shaft. It will be appreciated that a plurality of speeds could be provided using one input drive shaft and one idler shaft wherein each speed of the plurality of speeds of the transmission comprised one pair of paired helical cut gears on the input drive shaft and one pair of paired helical cut gears on the single idler shaft.

Engagement or disengagement of the gears is caused to take place by the pushing together or spreading apart of the driven helical gear pairs on the respective idler shafts so that a given driven helical gear pair is either engaged or disengaged with its respective helical drive gear pair on the input drive shaft 1. This axial spreading and pushing together of the driven helical gear pairs for engagement or disengagement can be accomplished by mechanical, hydraulic or electro-mechanical actuators working through shifting forks linked to the outside faces of the driven helical gears on the idler shafts. An illustrative example will hereinafter be set forth.

As can be seen by reference to FIG. 1, the driven helical gear pairs are disengaged from the drive helical gear pairs on the input drive shaft 1 by spreading them more widely apart than the total width of their respective drive helical gear pair. Conversely, a driven helical gear pair on an idler shaft is engaged by forcing the pair together so that it is engaged with its respective drive helical gear pair located on the input drive shaft 1. If desired, changing gears can be facilitated by using synchromesh rings on the drive helical gear pairs or the driven gear pairs. The mechanical mechanism by which gears are changed is not part of the present invention and can be comprised of any of a large number of gear changing mechanical mechanisms known in the art.

In practice, a gear change would comprise the following sequence. The prime mover (not illustrated) would be declutched from the input drive shaft 1. The currently engaged gears would be disengaged by actuating appropriate shifting forks to spread an engaged driven helical gear pair out of engagement with a respective drive helical gear pair. The shifting forks for a driven helical gear pair desired to be engaged would be actuated to press this driven helical gear pair together. The prime mover would be re-engaged to input shaft 1 by re-engaging the clutch.

Figure 5:
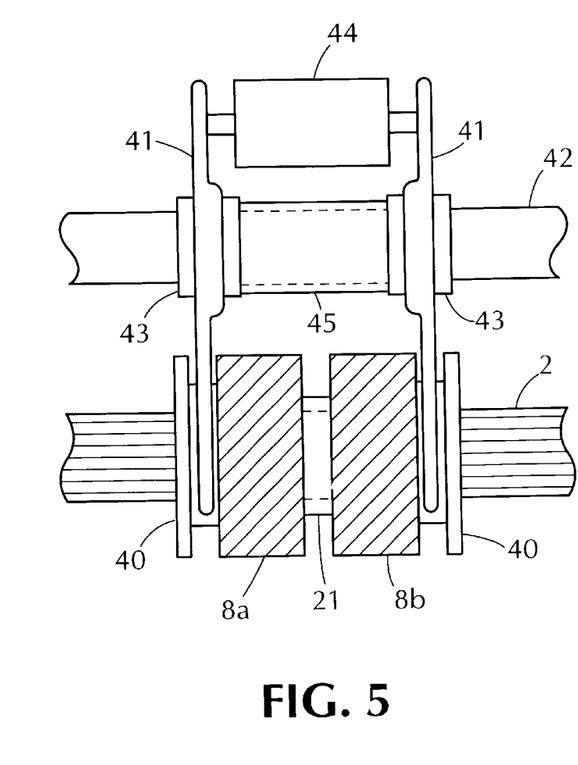
FIG. 5 is a schematic view of one embodiment of a shifting mechanism suitable for use with the transmission of the present invention.

FIG. 5 is a schematic illustration of an example of a shifting mechanism suitable for use with the multi-speed transmission of the present invention. The shifting mechanism illustrated in FIG. 5 is a non-limiting example and does not itself form part of the present invention. Any known suitable shifting mechanism may be used by one skilled in the art.

With reference to FIG. 5, driven helical gear 8a has a circumferential groove and lip 40 on the side of gear 8a facing the first end 33 of idler shaft 2. Similarly, driven gear 8b has a circumferential groove and lip 40 on the side of gear 8b facing the second end 34 of idler shaft 2. The lip and grooves 40 permit shifting forks 41 to move gears 8a, 8b in either direction along spline idler shaft 2.

The shifting forks 41 are mounted on and move along smooth shaft 42, with shaft 42 running through bushings 43. The shifting forks 41 are pushed apart or pulled together by a double acting actuator 44. The distance between the forks 41 when driven helical gears 8a, 8b are pushed together in the engaged position is determined by sleeve 45. The shaft 42 running through sleeve 45 is illustrated by dashed lines. The sleeve 45 holds the shifting forks 41 apart sufficiently to insure that engaged driven helical gear pair 8a, 8b has the freedom to move axially along idler shaft 2 to center itself opposite drive helical gear pair 6a, 6b. Collar or spacer 21 insures that gears 8a, 8b have a sufficient gap between them when they are engaged to prevent contact between gears 6a and 8b, or alternatively between gears 6b and 8a, as described above.

Figure 6:
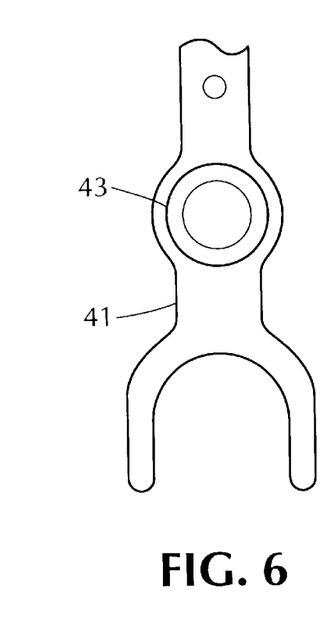
FIG. 6 is a schematic side view of a shifting fork used in the shifting mechanism illustrated in FIG. 5.

FIG. 6 is a schematic side view of a shifting fork 41 used in the shifting mechanism of FIG. 5.

With further reference to FIG. 1, the multi-speed transmission of the present invention is also provided with an output shaft 4 which has an axis parallel to input drive shaft 1, idler shaft 2 and idler shaft 3. Output drive helical gear pair 11a, 11b is mounted on spline idler shaft 2 near the second end 34 for rotation by idler shaft 2. Output helical gears 11a and 11b are also mounted on idler shaft 2 for axial movement on idler shaft 2. Output drive helical gear pair 12a, 12b is mounted on spline idler shaft 3 for rotation by idler shaft 3. Output helical gears 12a and 12b are also mounted on idler shaft 3 for axial movement on idler shaft 3. In the embodiment illustrated in FIG. 1, the outside diameters of gear pairs 11a, 11b and 12a, 12b are the same.

Output shaft 4 has mounted thereon near first end driven output helical gear pair 13a, 13b for rotating output shaft 4. Similar to drive helical gear pairs 5a, 5b and 6a, 6b, output helical gear pair 13a, 13b is fixedly mounted on output shaft 4 so that these gears do not move in the axial direction of output shaft 4.

In the embodiment illustrated in FIG. 1, output drive helical gear pairs 11a, 11b and 12a, 12b are permanently engaged with driven output helical gear pair 13a, 13b. However, gear pairs 11a, 11b and 12a, 12b could be equipped with engagement mechanisms similar to those used for engaging and disengaging the idler shaft gear pairs 7, 8, 9, and 10, such that gear pairs 11a, 11b, and 12a, 12b could be engaged or disengaged from output gear pair 13a, 13b. This would allow the idler shaft that is not being driven to be disengaged from the output shaft 4.

In the embodiment illustrated in FIG. 1, the angle of the helical cut on output drive helical gear pairs 11a, 11b and 12a, 12b is the same sense or same hand as on the driven helical gear pairs mounted in the idler shafts 2 and 3. Likewise, the angle of the helical cut on driven output helical gears 13a, 13b is the same sense or the same hand as that on the drive helical gear pairs on the input drive shaft 1. Thus, in the illustrated embodiment, rotation of the idler shaft 2 by input drive shaft 1 will create thrust forces causing output drive helical gears 11a, 11b to move toward one another in the axial direction of idler shaft 2. Collar 21 is located between gears 11a and 11b. Inter-gear spacing considerations would be the same as previously discussed with respect to the driven helical gear pairs on idler shaft 2.

Furthermore, in the embodiment illustrated in FIG. 1, rotation of output drive helical gears 11a, 11b by idler shaft 2 will create a thrust force at output driven helical gears 13a, 13b which will want to cause separation of output driven gears 13a, 13b in the axial direction of output shaft 4. No actual separation takes place because output driven helical gears 13a, 13b are fixedly mounted to output shaft 4. Output drive helical gears 11a, 11b will move on output shaft 4 to center themselves on output driven helical gears 13a, 13b to balance the load transmission. As is apparent, output shaft 4 rotates in the same direction as input drive shaft 1.

As an alternative embodiment, the sense or the hand of the angle of the helical cut on output drive helical gears 11a, 11b and 12a, 12b and on output driven helical gears 13a, 13b could be reversed. In this alternative embodiment, output drive helical gears 11a, 11b will separate in the axial direction of idler shaft 2. This separation would be restrained, e.g., by a retainer member or collar fixed to idler shaft 2 on either side of output drive helical gear pair 11a, 11b. Forces will be established to make output driven helical gears 13a, 13b want to move toward each other in the axial direction of output shaft 4. In this case output gear pair 13a, 13b must be mounted on shaft 4 such that the pair is free to move axially to center itself opposite gear pairs 11a, 11b or 12a, 12b. Alternatively, gear pair 13a, 13b can be fixedly mounted to shaft 4, as long as shaft 4 can freely move axially to accomplish the required centering of gear pair 13a, 13b opposite pairs 11a, 11b or 12a, 12b.

By altering the outside diameter of output drive helical gear pairs 11a, 11b and 12a, 12b, one can vary the final ratio of all the gears. For example, if the outside diameter of output drive helical gears 11a, 11b was made smaller, this would increase the speed reduction ratios of gears 7a, 7b and 8a, 8b. Likewise, if the outside diameter of output drive helical gears 12a, 12b was increased in size, this would decrease the speed reduction ratios of gears 9a, 9b and 10a, 10b. The axes of gears 11a, 11b; 12a, 12b; and 13a, 13b are parallel (i.e., the axes of shafts 2, 3 and 4 are parallel), but they are not necessarily in the same plane. If the outside diameter of gear pair 11a, 11b and the outside diameter of gear pair 12a, 12b, were such that the desired size of gears 13a, 13b would not fit between gears 11a, 11b and 12a, 12b, the axis of output shaft 4 could be offset from the plane formed by the axes of idler shafts 2 and 3, although all axes would be parallel to one another. This offset would allow the accommodation of a wide variety of sizes of gears 11a, 11b, 12a, 12b and 13a, 13b while still allowing the respective engagement of gears 11a, 11b and 12a, 12b with output shaft gears 13a, 13b, in the fashion described above.

More than one pair of output drive helical cut gears could be provided on each idler shaft for mating and engaging more than one pair of output driven helical cut gears provided on the output shaft using the teachings hereinafter set forth for the embodiment of the present invention illustrated in FIG. 2.

It is readily apparent to one skilled in the art that a reversing gear is accomplished by use of an additional idler shaft with its own pair of gears driving the output shaft by another idler gear pair to cause reverse rotational output direction. In the embodiment where the outside diameters of output drive helical gears 11a, 11b and 12a, 12b are different and output shaft 4 is not in the same plane as idler shafts 2 and 3, a reversing gear could be provided by extending drive input shaft 1 and mounting another helical cut gear pair near the end 32 of input drive shaft 1 which is selectively engageable and disengageable with output driven helical cut gears 13a, 13b mounted on output shaft 4.

Figure 2:
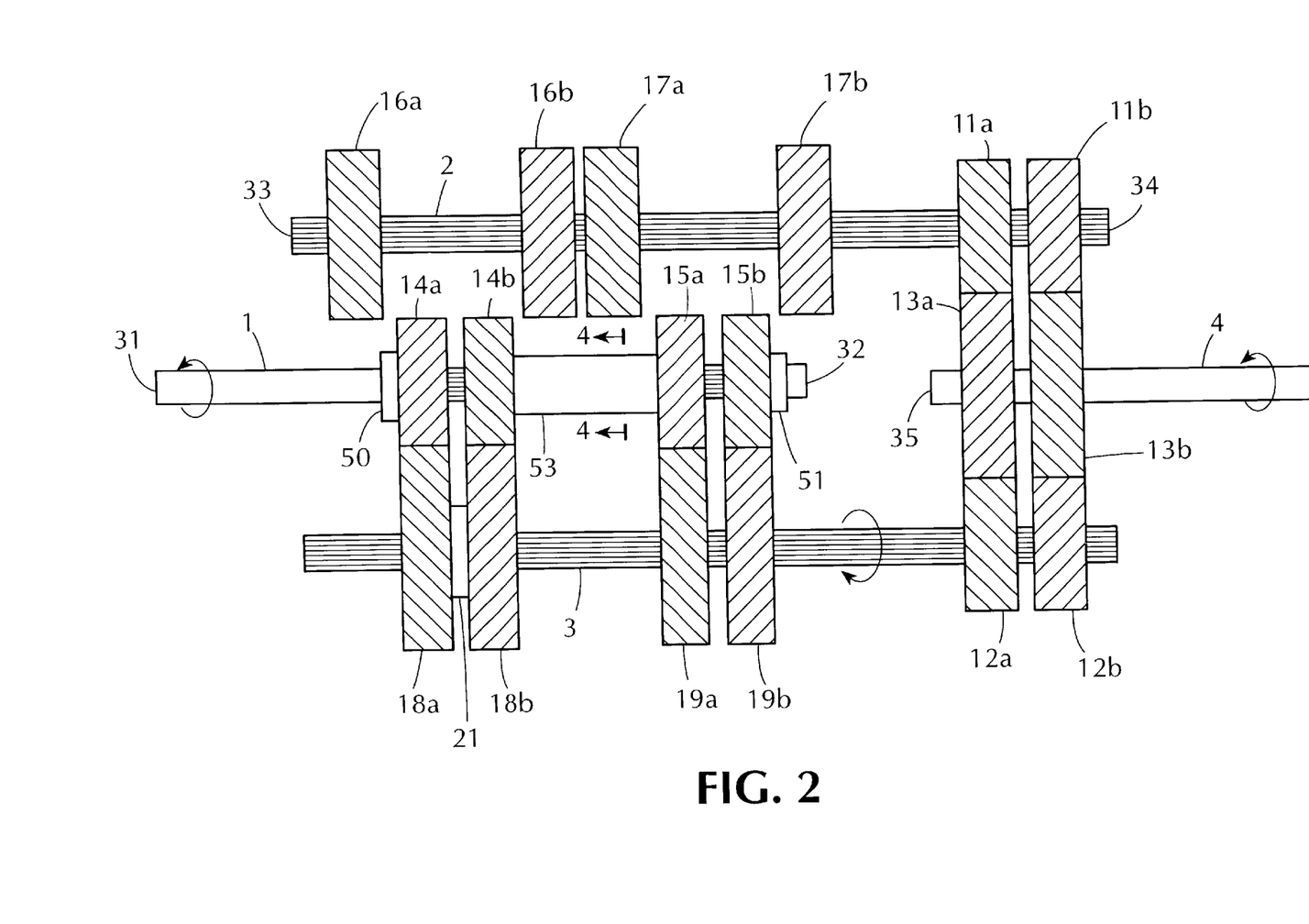
FIG. 2 is a schematic view of another embodiment of an automotive transmission in accordance with the present invention illustrating a two speed transmission using for each speed of the transmission two pairs of paired helical gears on an input drive shaft and two pairs of paired helical gears on an idler shaft.

Another embodiment of a multi-gear transmission using paired helical gears, in accordance with the present invention, is illustrated in FIG. 2. In the embodiment of FIG. 2, for each transmission speed, more than one pair of helical cut gears are located on the input drive shaft for being engaged by more than one pair of helical cut gears located on the idler shaft.

The embodiment of FIG. 2 illustrates a two speed transmission using for each transmission speed two pairs of paired helical cut gears on the drive shaft and two pairs of paired helical cut gears on the driven shaft. As discussed, in conjunction with the embodiment of FIG. 1, the angle of the helical cut of each gear of a gear pair is the same but in the opposite sense or hand to one another. As in the embodiment of FIG. 1, a driven gear would have a helical cut at the same angle but in the opposite sense or hand to the helical cut of an engaging drive gear. As in the embodiment of FIG. 1, the transmission of the embodiment of FIG. 2 includes an input drive shaft 1, two idler shafts 2 and 3, and an output shaft 4. Again, the input drive shaft would be connected to a prime mover such as an internal combustion engine (not illustrated).

Input drive shaft 1 has mounted thereon two pairs of paired helical cut gears 14a, 14b and 15a, 15b. Gears 14a, 14b and 15a, 15b are of the same size.

Mounted on idler shaft 2 are two pairs of driven helical cut gears 16a, 16b and 17a, 17b. Mounted on idler shaft 3 are two pairs of driven helical cut gears 18a, 18b and 19a, 19b. As in the embodiment of FIG. 1, idler shafts 2 an 3 are spline shafts so that the gears mounted on the idler shafts can more in the axial direction of the idler shaft as well as transmit force to the idler shafts for rotation of the idler shafts. Again, in preferred embodiments, a member, such as collar 21, (illustrated only between gears, 18a, 18b) would be disposed between gears 16a, 16b; 17a, 17b; 18a, 18b; and 19a, 19b; to prevent the gear pairs from abutting against one another when created thrust forces causes the gear pair to move toward one another on the idler shaft. The reasons for this have been previously discussed.

In the embodiment of FIG. 2, for the drive helical cut gear pairs mounted on input drive shaft 1, only the two outermost gears of the gear pairs used for each transmission speed are restrained from axial movement on the input drive shaft 1. Thus, in the FIG. 2 illustration, gears 14a and 15b are restrained from axial movement on input drive shaft 1. Gears 14b and 15b are mounted for axial movement on input drive shaft 2. Thus, input drive shaft 1 could be a spline shaft in the range of contemplated axial movement of gears 14b and 15a. For convenience, the entire input drive shaft 1 could be a spline shaft. Gears 14a and 15b could be restrained from axial movement on the spline input drive shaft 1 by a retainer member 50 being fixedly mounted to the input drive shaft 1 on the side of gear 14a facing first end 31 and a retainer member 51 being fixedly mounted on input drive shaft 1 on the side of gear 15b facing second end 32.

Helical cut drive gear pair 14a, 14b have a helical cut such that gears 14a and 14b move away from each other in the axial direction of the input drive shaft by thrust forces created by rotation of the input drive shaft 1 by the prime mover and engagement and mating with a pair of helical cut gears on an idler shaft. Likewise, helical cut drive gear pair 15a, 15b have a helical cut which cause them to separate or move away from one another in the axial direction of the input drive shaft 1. Since gear 14a only moves toward first end 31 of input drive shaft 1 and since gear 15b only moves toward the second end 32 of input drive shaft 1 due to rotation of input drive shaft 1 by the prime mover, it is sufficient to restrain the axial movement of gears 14a and 15b by the previously discussed retainer members 50 and 51.

Drive shaft collar member 53 is disposed between gears 14b and 15a. It is sufficient that drive shaft collar member 53 be a cylindrical shaped member surrounding the splined portion of input drive shaft 1 in a loose enough manner so as to permit drive shaft collar member 53 to move freely in the axial direction of input drive shaft 1. Since thrust forces cause gear 14b to move away or separate from gear 14a in the axial direction and cause gear 15a to move away or separate from gear 14b in the axial direction, gears 14b and 15a first move toward one another in the axial direction of input drive shaft 1 and press against one another or bear in compression against one another in the axial direction through drive shaft collar member 53. This causes gears 14b and 15a to move together in the axial direction of input drive shaft 1 so, in the illustrated embodiment of FIG. 2, they center themselves on engaged and mating driven gears 18b and 19a on idler shaft 3. FIG. 3 is a cross-section along line 3—3 of FIG. 2 illustrating a cross-section of drive shaft collar member 53. It is also apparent that gear 14b, gear 15a, and drive shaft collar member 53 could be a unitary structure machined from the same piece of metal stock.

Helical cut gears 18a, 18b, mounted on idler shaft 3, have a helical cut opposite to the helical cut on gears 14a, 14b. Therefore, rotation of input drive shaft 1 and the engagement and mating of gears 18a, 18b with gears 14a, 14b results in thrust forces that cause gears 18a, 18b to move toward one another in the axial direction of idler shaft 3. Helical cut gears 19a, 19b, mounted on idler shaft 3, have a helical cut opposite to the helical cut on gears 15a, 15b. Therefore, rotation of input drive shaft 1 and the engagement and mating of gears 19a, 19b with gears 15a, 15b results in thrust forces that causes gears 19a, 19b to move toward one another in the axial direction of idler shaft 3.

In operation in the illustrated embodiment of FIG. 2, gears 18a, 18b move together in the axial direction of idler shaft 3 to center themselves on gears 14a, 14b and gears 19a, 19b move together in the axial direction of idler shaft 3 to center themselves on gears 15a, 15b. This action is in combination with the previously described action of the combined movement of gears 14b and 15a. This results in a balancing of loads and an approximate load sharing amongst gears.

The foregoing description with respect to gear pair 18a, 18b and gear pair 19a, 19b on idler shaft 3 and their relationship to the drive gears on the input drive shaft 1 applies to helical cut gear pair 16a, 16b and helical cut gear pair 17a, 17b on idler shaft 2 and their relationship to the drive gears on the input drive shaft 1.

Gears in the embodiment of FIG. 2 could be engaged and disengaged using mechanisms described in connection with the FIG. 1 embodiment.

Helical gear pair 14a, 14b and helical gear pair 15a and 15b on input drive shaft 1 may be referred to a drive set. Gears 14a, 14b, 15a and 15b would all have the same outside diameter. Gear 14a could be referred to as a first drive helical gear half and gear 14b could be referred to a second drive helical gear half. Likewise, gear 15a could be referred to as a first drive helical gear half and gear 15b could be referred to as second drive helical gear half.

More than two pairs of helical gears may be used in a drive set of helical gears. The actual number of helical gear pairs used in a drive set would depend on the needs of the design. If more than two pairs of helical gears are used in the drive set, the two outermost gears would be restrained from axial movement along the input drive shaft 1. All of the remaining helical gears would be mounted on the input drive shaft for axial movement along the drive shaft with a member, such as drive shaft collar member 53, located between adjacent interior gears which move toward one another in the axial direction of the drive shaft due to rotation of the drive shaft and engagement and mating with a respective driven helical cut gear.

Helical gear pair 18a, 18b and helical gear pair 19a, 19b on idler shaft 3 may be referred to as driven set of helical gears. Gears 18a, 18b, 19a and 19b would all have the same outside diameter. Gear 18a could be referred to as a first driven helical gear half and gear 18b could be referred to as a second driven helical gear half. Likewise, gear 19a could be referred to a first driven helical gear half and gear 19b could be referred to as a second driven helical gear half.

More than two pairs of helical gears may be used in a driven set of helical gears. Again the actual number of helical gear pairs used in a driven set would depend on the needs of the design. For a driven set of helical gears, all the helical gears would be mounted on an idler shaft for axial movement on the idler shaft.

The number of pairs of helical gears in a drive set is equal to the number of pairs of helical gears in a driven set.

In the embodiment of FIG. 2, helical gear pair 16a, 16b and helical gear pair 17a, 17b comprise another driven set of helical gears.

Two or more drive sets of helical gears may be provided on the input drive shaft. Likewise, two or more driven sets of helical gears may be provided on each idler shaft. More than two idler shafts may be provided with one or more driven sets of helical gears located on each idler shaft.

Likewise, there would be only one idler shaft, with at least two driven sets of helical gears on the idler shaft and at least two drive sets of helical gears provided on the input drive shaft.

The output shaft 4 and the output gear arrangement would be the same as discussed in conjunction with FIG. 1. For an embodiment such as described in conjunction with FIG. 2, arrangements using multiple pairs of helical gears on the output shaft 4 may be useful.

Although preferred embodiments of the present invention have been described in detail, it is apparent that modifications may be made by one skilled in the art within the spirit and scope of the present invention as defined in the claims.

What is claimed is:

1. A method for operating a transmission comprising:
   providing a drive shaft with a first pair of helical cut drive gears mounted on said drive shaft for rotation of said first pair of helical cut drive gears by said drive shaft;
   providing a first idler shaft parallel to said drive shaft;
   providing a first pair of helical cut driven gears mounted on said first idler shaft for rotating said first idler shaft upon selective engagement with said first pair of helical cut drive gears mounted on said drive shaft, said first idler shaft having an axial direction, said first pair of helical cut driven gears being further mounted for axial direction movement on said first idler shaft;
   selectively engaging said first pair of helical cut driven gears mounted on said first idler shaft with said first pair of said helical cut drive gears mounted on said drive shaft and rotating said drive shaft thereby causing each gear of said first pair of helical cut driven gears mounted on said first idler shaft to move toward one another in the axial direction of said first idler shaft and causing said first pair of helical cut driven gears mounted on said first idler shaft locating themselves with respect to said selectively engaged first pair of helical cut drive gears mounted on said drive shaft for providing balanced load transmission.

2. A method for operating a transmission according to claim 1 comprising:
   providing said drive shaft with a second pair of helical cut drive gears mounted on said drive shaft for rotation of said second pair of helical cut drive gears by said drive shaft;
   providing a second pair of helical cut driven gears mounted on said first idler shaft for rotating said first idler shaft upon selective engagement with said second pair of helical cut drive gears, said second pair of helical cut driven gears being further mounted for axial direction movement on said first idler shaft;
   disengaging said first pair of helical cut driven gears mounted on said first idler shaft from said first pair of helical cut drive gears mounted on said drive shaft;
   selectively engaging said second pair of helical cut driven gears mounted on said first idler shaft with said second pair of said helical cut drive gears mounted on said drive shaft and rotating said drive shaft thereby causing each gear of said second pair of helical cut driven gears mounted on said first idler shaft to move toward one another in the axial direction of said first idler shaft and causing said second pair of helical cut driven gears mounted on said first idler shaft locating themselves with respect to said selectively engaged second pair of helical cut drive gears mounted on said drive shaft for providing balanced load transmission.

3. A method for operating a transmission according to claim 2 comprising:
   providing a plurality of pairs of helical cut drive gears mounted on said drive shaft for rotation by said drive shaft;
   providing a plurality of pairs of helical cut driven gears mounted on said first idler shaft for rotating said first idler shaft upon selective engagement of one of said pairs of helical cut driven gears mounted on said first idler shaft with a respective one of said plurality of pairs of helical cut drive gears mounted on said drive shaft, each of said pairs of helical cut driven gears being further mounted for axial direction movement on said first idler shaft.

4. A method for operating a transmission according to claim 1 comprising:
   providing a second idler shaft parallel to said drive shaft;
   providing a first pair of helical cut driven gears mounted on said second idler shaft for rotating said second idler shaft upon selective engagement with said first pair of helical cut drive gears mounted on said drive shaft, said second idler shaft having an axial direction, said first pair of helical cut driven gears being further mounted for axial direction movement on said second idler shaft;
   disengaging said first pair of helical cut driven gears mounted on said first idler shaft from said first pair of helical cut drive gears mounted on said drive shaft;
   selectively engaging said first pair of helical cut driven gears mounted on said second idler shaft with said first pair of said helical cut drive gears on said drive shaft and rotating said drive shaft thereby causing each gear of said first pair of helical cut driven gears mounted on said second idler shaft to move toward one another in the axial direction of said second idler shaft and causing said first pair of helical cut driven gears mounted on said second idler shaft locating themselves with respect to said selectively engaged first pair of helical cut drive gears mounted on said drive shaft for providing balanced load transmission.

5. A method for operating a transmission according to claim 4 comprising:

providing said drive shaft with a second pair of helical cut drive gears mounted on said drive shaft for rotation of said second pair of helical cut drive gears by said drive shaft;

providing a second pair of helical cut driven gears mounted on said second idler shaft for rotating said second idler shaft upon selective engagement with said second pair of helical cut drive gears, said second pair of helical cut driven gears being further mounted for axial direction movement on said second idler shaft;

disengaging said first pair of helical cut driven gears mounted on said second idler shaft from said first pair of helical cut drive gears mounted on said drive shaft;

selectively engaging said second pair of helical cut driven gears mounted on said second idler shaft with said second pair of said helical cut drive gears mounted on said drive shaft and rotating said drive shaft thereby causing each gear of said second pair of helical cut driven gears mounted on said second idler shaft to move toward one another in the axial direction of said second idler shaft and causing said second pair of helical cut driven gears mounted on said second idler shaft locating themselves with respect to said selectively engaged second pair of helical cut drive gears mounted on said drive shaft for providing balanced load transmission.

6. A method for operating a transmission according to claim 5 comprising:

providing a plurality of pairs of helical cut drive gears mounted on said drive shaft for rotation by said drive shaft;

providing a plurality of pairs of helical cut driven gears mounted on said second idler shaft for rotating said second idler shaft upon selective engagement of one of said pairs of helical cut driven gears mounted on said second idler shaft with a respective one of said plurality of pairs of helical cut drive gears mounted on said drive shaft, each of said pairs of helical cut driven gears being further mounted for axial direction movement on said second idler shaft.

7. A method for operating a transmission according to claim 4 comprising:

providing a plurality of idler shafts parallel to said drive shaft;

providing at least one pair of helical cut driven gears mounted on each idler shaft for rotating a respective idler shaft upon selective engagement with said first pair of helical cut drive gears mounted on said drive shaft, each idler shaft having an axial direction, each of said at least one pair of helical cut driven gears being further mounted on its respective idler shaft for axial direction movement on its respective idler shaft.

8. A method for manufacturing a transmission comprising:

providing a drive shaft and mounting a first pair of helical cut drive gears on said drive shaft for rotation of said first pair of helical cut drive gears by said drive shaft;

providing a first idler shaft parallel to said drive shaft;

mounting a first pair of helical cut driven gears on said first idler shaft for rotating said first idler shaft upon selective engagement with said first pair of helical cut drive gears, said first idler shaft having an axial direction;

further mounting said first pair of helical cut driven gears on said first idler shaft for axial direction movement on said first idler shaft;

providing said helical cut on said first pair of helical cut drive gears and providing said helical cut on said first pair of helical cut driven gears mounted on said first idler shaft whereby upon selectively engaging said first pair of helical cut driven gears mounted on said first idler shaft with said first pair of helical cut drive gears mounted on said drive shaft and rotating said first pair of helical cut drive gears by rotating said drive shaft, said helical cut provided on said first pair of helical cut driven gears mounted on said first idler shaft and said helical cut provided on said first pair of helical cut drive gears results in each gear of said first pair of helical cut driven gears mounted on said first idler shaft moving toward one another in the axial direction of said first idler shaft and with said first pair of helical cut driven gears mounted on said first idler shaft locating themselves with respect to said selectively engaged first pair of helical cut drive gears mounted on said drive shaft for providing balanced load transmission.

9. A method for manufacturing a transmission according to claim 8 comprising:

providing a second idler shaft parallel to said drive shaft;

mounting a first pair of helical cut driven gears on said second idler shaft for rotating said second idler shaft upon selective engagement with said first pair of helical cut drive gears, said second idler shaft having an axial direction;

further mounting said first pair of helical cut driven gears on said second idler shaft for axial direction movement on said second idler shaft;

providing said helical cut on said first pair of helical cut driven gears mounted on said second idler shaft whereby upon selectively engaging said first pair of helical cut driven gears mounted on said second idler shaft with said first pair of helical cut drive gears mounted on said drive shaft and rotating said first pair of helical cut drive gears by rotating said drive shaft, said helical cut provided on said first pair of helical cut driven gears mounted on said second idler shaft and said helical cut provided on said first pair of helical cut drive gears mounted on said drive shaft results in each gear of said first pair of helical cut driven gears mounted on said second idler shaft moving toward one another in the axial direction of said second idler shaft and with said first pair of helical cut driven gears mounted on said second idler shaft locating themselves with respect to said selectively engaged first pair of helical cut drive gears mounted on said drive shaft for providing balanced load transmission.

10. A method for manufacturing a transmission according to claim 9 comprising:

mounting a second pair of helical cut drive gears on said drive shaft for rotation of said second pair of helical cut drive gears by said drive shaft, mounting a second pair of helical cut driven gears on said second idler shaft for rotating said second idler shaft upon selective engagement with said second pair of helical cut drive gears;

further mounting said second pair of helical cut driven gears on said second idler shaft for axial direction movement on said second idler shaft;

providing said helical cut on said second pair of helical cut drive gears and providing said helical cut on said second pair of helical cut driven gears mounted on said second idler shaft whereby upon selectively engaging said second pair of helical cut driven gears mounted on said second idler shaft with said second pair of helical cut drive gears mounted on said drive shaft and rotating said second pair of helical cut drive gears by rotating said drive shaft, said helical cut provided on said second pair of helical cut driven gears mounted on said second idler shaft and said helical cut provided on said second pair of helical cut drive gears mounted on said drive shaft results in each gear of said second pair of helical cut driven gears mounted on said second idler shaft moving toward one another in the axial direction of said second idler shaft and with said second pair of helical cut driven gears mounted on said second idler shaft locating themselves with respect to said selectively engaged second pair of helical cut drive gears mounted on said drive shaft for providing balanced load transmission.

11. A method for manufacturing a transmission according to claim 9 comprising:

mounting a plurality of pairs of helical cut drive gears on said drive shaft for rotation by said drive shaft;

mounting a plurality of pairs of helical cut driven gears on said second idler shaft for rotating said second idler shaft upon selective engagement of one of said pairs of helical cut driven gears mounted on said second idler shaft with a respective one of said plurality of pairs of helical cut drive gears mounted on said drive shaft;

further mounting each of said pairs of helical cut driven gears mounted on said second idler shaft for axial direction movement on said second idler shaft.

12. A method for manufacturing a transmission according to claim 8 comprising:

mounting a second pair of helical cut drive gears on said drive shaft for rotation of said second pair of helical cut drive gears by said drive shaft;

mounting a second pair of helical cut driven gears on said first idler shaft for rotating said first idler shaft upon selective engagement with said second pair of helical cut drive gears;

further mounting said second pair of helical cut driven gears on said first idler shaft for axial direction movement on said first idler shaft;

providing said helical cut on said second pair of helical cut drive gears and providing said helical cut on said second pair of helical cut driven gears mounted on said first idler shaft whereby upon selectively engaging said second pair of helical cut driven gears mounted on said first idler shaft with said second pair of helical cut drive gears mounted on said drive shaft and rotating said second pair of helical cut drive gears by rotating said drive shaft, said helical cut provided on said second pair of helical cut driven gears mounted on said first idler shaft and said helical cut provided on said second pair of helical cut drive gears mounted on said drive shaft results in each gear of said second pair of helical cut driven gears mounted on said first idler shaft moving toward one another in the axial direction of said first idler shaft and with said second pair of helical cut driven gears mounted on said first idler shaft locating themselves with respect to said selectively engaged second pair of helical cut drive gears mounted on said drive shaft for providing balanced load transmission.

13. A method for manufacturing a transmission according to claim 8 comprising:

mounting a plurality of pairs of helical cut drive gears on said drive shaft for rotation by said drive shaft;

mounting a plurality of pairs of helical cut driven gears on said first idler shaft for rotating said first idler shaft upon selective engagement of one of said pairs of helical cut driven gears mounted on said first idler shaft with a respective one of said plurality of pairs of helical cut drive gears mounted on said drive shaft;

further mounting each of said pairs of helical cut driven gears mounted on said first idler shaft for axial direction movement on said first idler shaft.

14. A method for manufacturing a transmission according to claim 8 comprising:

providing a plurality of idler shafts parallel to said drive shaft;

mounting at least one pair of helical cut driven gears on each idler shaft for rotating a respective idler shaft upon selective engagement with said first pair of helical cut drive gears mounted on said drive shaft, each idler shaft having an axial direction;

further mounting each of said at least one pair of helical cut driven gears on its respective idler shaft for axial direction movement on the respective idler shaft.

* * * * *